(No Model.)
C. C. TYLER.
MILLING CUTTER AND DIES FOR MAKING SAME.
No. 551,063. Patented Dec. 10, 1895.
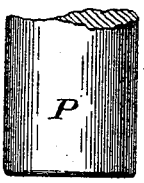
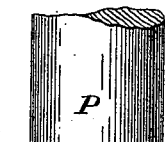
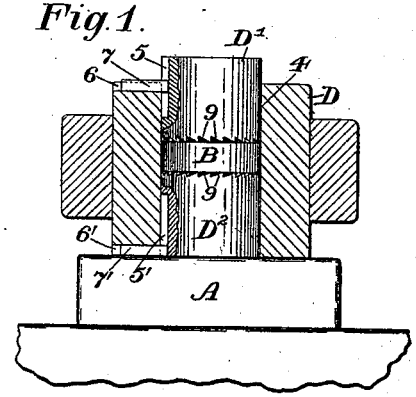
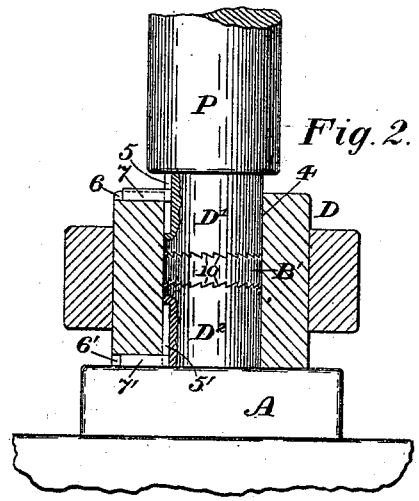
Fig. 1. Fig. 2.
Fig. 4. Fig. 3. Fig. 7.
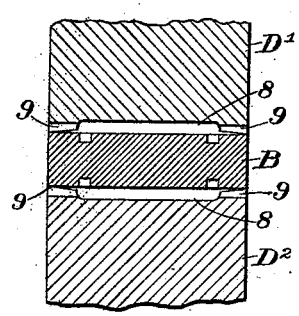
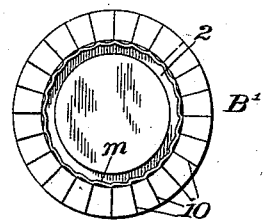
Fig. 5. Fig. 9. Fig. 8.
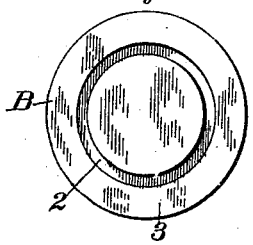
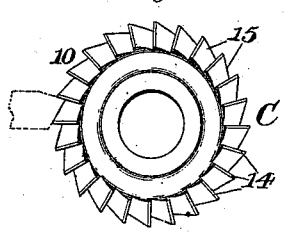
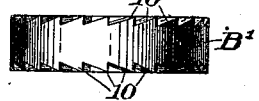
Fig. 12.
Fig. 6. Fig. 10. Fig. 13.
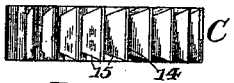
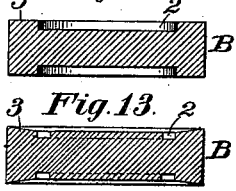
Fig. 11.
Witnesses:
J. L. Edwards Jr.
Fred. J. Dole.
Inventor:
Charles C. Tyler.
By his Attorney,
F. A. Richards

UNITED STATES PATENT OFFICE.

CHARLES C. TYLER, OF HARTFORD, CONNECTICUT.

MILLING-CUTTER AND DIES FOR MAKING SAME.

SPECIFICATION forming part of Letters Patent No. 551,063, dated December 10, 1895.

Application filed January 25, 1895. Serial No. 536,171. (No model.)

*To all whom it may concern:*

Be it known that I, CHARLES C. TYLER, a citizen of the United States, residing at Hartford, in the county of Hartford and State of Connecticut, have invented certain new and useful Improvements in Milling-Cutters and Dies for Making the Same, of which the following is a specification.

This invention relates to the manufacture of milling-cutters of that class known to the art as "face mill" or "side mills," and which are especially intended for facing hubs and for analogous purposes, said cutters being used for "end mills" and sometimes on counterbores.

The object of my present invention is, primarily, to furnish an improved apparatus whereby a milling-cutter of the class specified, having successive longitudinally and transversely relieved teeth, may be produced by compression from a plain untoothed blank with rapidity, precision, and economy, and whereby each tooth shall be subjected to compression over the entire area thereof, to thereby compact and solidify the tooth and increase the stability and efficiency of the cutter.

Another object of my present invention is to furnish an improved apparatus whereby successive relieved teeth and tooth spaces or furrows may be formed by compression in the face or faces of a plain untoothed blank, at or near the outer edge thereof, without disintegrating or otherwise distorting the metal at the middle or outer portions of said blank.

Another object of my invention is to furnish improved apparatus whereby a milling-cutter blank, having successive relieved teeth upon opposite sides thereof, may be formed by compression at one operation.

Another object of my invention is to furnish an improved milling-cutter blank adapted to have relieved teeth formed by compression on opposite faces thereof and having a space or groove formed in opposite sides thereof to receive the flowage of metal during compression and prevent disintegration or distortion of the metal of the middle portion of said blank.

Another object of my invention is to furnish a face-mill cutter-blank having compressed teeth upon its opposite side faces at or near the periphery thereof.

In the drawings accompanying and forming part of this specification, Figure 1 is a sectional side elevation of one form of apparatus especially adapted for use in making my improved milling-cutter blanks, said figure showing a portion of the upper part or bed of an ordinary drop-press, the lower one of which is supported upon said bed, a pair of oppositely-disposed teeth-forming compressor-dies, a casing or blank-receiving die inclosing the two compressor-dies, a plain untoothed discous blank supported in position to be operated upon in the blank-receiving die and between said teeth-forming compressor-dies, and a die-actuator or "plunger" in an elevated position above the upper compressor-die. Fig. 2 is a view similar to Fig. 1, showing the dies and accessories in the positions they occupy immediately after a milling-cutter blank has been compressed into toothed form thereby. Fig. 3 is an enlarged longitudinal section of a portion of the two teeth-forming compressor-dies, on an enlarged scale, with an untoothed blank between them and in position to be operated upon thereby. Fig. 4 is a plan view of the tooth-forming end of one of the compressor-dies. Fig. 5 is a plan view of one form of untoothed discoidal blank preparatory to its subjection to compression. Fig. 6 is a sectional side elevation of the untoothed cutter-blank shown in Fig. 5. Figs. 7 and 8 illustrate by plan and side views, respectively, the cutter-blank shown in Figs. 5 and 6 after the same has been subjected to compression between the compressor-dies shown in Fig. 3, said figures showing said blank as toothed upon opposite faces thereof and in condition to be peripherally milled or ground to effect the required longitudinal relief or "backing-off" for the teeth and to be axially bored to form a completed milling-cutter of the class specified. Fig. 9 is a plan view of a completed milling-cutter of the class specified as produced by my improved apparatus, said figure also showing in dotted lines a portion of a cutting-tool or "mill" in position for peripherally backing off a tooth of said milling-cutter. Figs. 10 and 11 are side and cross-sectional views, respectively, of the milling-cutter shown in Fig. 9. Fig. 12 is a cross-sectional view of a modified form of untoothed blank from which a milling-cutter of the class specified is adapted to be made in accordance with my improved apparatus, and Fig. 13 is a cross-sectional view of another form of blank from which a milling-cutter of this class is adapted to be made.

Similar characters represent like parts in all the figures of the drawings.

In the drawings only so much of one form of apparatus for making my improved toothed milling-cutter blanks is shown as is deemed necessary to clearly illustrate the operations of forming milling-cutter blanks.

In the manufacture of the improved circular milling-cutters of the class specified I preferably employ discoidal metallic blanks—such, for instance, as shown in Figs. 5, 6, 12, and 13, and designated in a general way by B—which blanks will, in practice, be of a diameter substantially coinciding with the diameter of the finished cutters to be made therefrom and will be of a thickness substantially coinciding with the width of the cutting-periphery of said finished cutter. The object of this is to make cutters of a predetermined size with a high degree of uniformity and precision with the least possible waste of metal. The blank B from which a finished cutter (such as shown in Figs. 9, 10, and 11, and designated by C) is to be made may be, if desired, (and usually will be,) a shade smaller in diameter than the diameter of the finished cutter and will be spread radially by compression to bring said blank to the finished diametrical size of a completed cutter parallel to the axis thereof. The blank represented in Figs. 5, 6, 12, and 13 will usually be stamped or cut out, by means of cutting-dies, from a sheet of metal of the requisite thickness and quality, and to provide means for accommodating the flowage of metal during compression, or during the formation of the teeth upon one or both faces of the blank by compression, a channel or flowage-groove 2 is formed in one or both faces of the blank, remote from the periphery thereof, as will be hereinafter more fully described.

In practice it has been found advantageous in making circular milling-cutters from blanks such as described to form an annular flowage-groove or channel in one or both faces of the blank, concentric to the axis of said blank, and remote from said axis, and between said axis and the tooth-forming face (designated by 3) of said blank. This produces a cutter-blank having a reinforced tooth-forming rim and a reinforced hub or middle portion, with a flowage-groove between said rim and hub, which groove forms a convenient means for accommodating the metal displaced, as shown at $m$ in Fig. 7, by compression in forming teeth in the side faces of the rim and relieves the central portion of the blank from pressure, which would otherwise tend to buckle, distort, or disintegrate the metal at the center of said blank, and also provides for the free and uniform displacement or flowage of the metal at the rim of said blank and secures to said teeth a uniform density and solidification, which is highly advantageous, in that it increases the stability and efficiency of the cutter.

As an instrumentality for producing my improved milling-cutter I usually employ an outer die or casing-die D, (see Figs. 1 and 2,) having an axial opening 4 therein, adapted for receiving the tooth-forming compressor-dies $D'$ and $D^2$ and the blank B to be operated upon by said dies, and a pair of teeth-forming compressor-dies $D'$ and $D^2$, supported as against rotation within the casing-die D.

As a convenient means for operating the compressor-dies $D'$ and $D^2$ to compress a blank and form teeth in one or both faces of said blank said dies will ordinarily be used in connection with any suitable drop-press, having the usual bed A, (a portion only of which is shown in Figs. 1 and 2,) adapted for supporting the dies referred to, and having a plunger or "drop" P in position and adapted for pressing the two compressor-dies $D'$ and $D^2$ toward each other, said dies $D'$ and $D^2$ being usually supported upon the bed A in the manner shown in Figs. 1 and 2 of the drawings.

As a convenient means for holding the compressor-dies $D'$ and $D^2$ against rotation relatively to the casing-die or outer die D and permit said dies $D'$ and $D^2$ to have longitudinal movement within said casing-die D said compressor-dies are shown longitudinally grooved at 5 and 5', respectively, for a portion of their length at their peripheries, and the casing-die D is shown radially recessed or slotted at or near the upper and lower edges thereof, as shown at 6 and 6', in which recesses are inserted keys 7 and 7', respectively, the inner ends of which keys extend into the grooves 5 and 5' of the compressor-dies $D'$ and $D^2$, respectively, and constitute guides therefor and also prevent rotation of said dies relatively to the casing-die D.

Each of the two compressor-dies $D'$ and $D^2$ will usually have the central portion of its working end axially countersunk or shallowly recessed, as shown at 8 most clearly in Figs. 3 and 4 of the drawings, so as to form a slightly-reinforced annular teeth-forming face contiguous to the periphery thereof, in which face are formed a series of successive tooth-shaped tooth-forming grooves 9, which are preferably inclined or relieved, as shown most clearly in Figs. 1, 2, 3, and 4 of the drawings. These grooves or tooth-forming furrows in the dies $D'$ and $D^2$ may be of any suitable contour to correspond to the desired contour of the teeth 10 to be formed in the blank B, said grooves being herein shown somewhat V-shaped in cross-section and being of greater depth at the periphery than at the inner edge of said tooth-forming portion.

In the drawings, Figs. 1, 2, and 3, I have shown both of the compressor-dies D' and D² as having their working ends toothed or grooved, so as to adapt them to form teeth upon each side or face of a blank and thereby produce at one operation a cutter-blank, as illustrated in Figs. 7 and 8 of the drawings; but it is desired to state in this connection that one of the said dies might have a plane working face, so as to produce a cutter-blank having teeth on but one face thereof. Therefore it is not desired to limit this invention to an apparatus for forming milling-cutter blanks embodying a pair of co-operating tooth-forming compressor-dies, both of which have toothed working ends.

The preferred series of operations for forming my improved milling-cutter is as follows: First, producing a plane-faced blank having a flowage-groove or channel remote from the periphery, and in one or both faces thereof, to form a tooth-forming rim intermediate to said flowage-groove and peripheral edge of said blank, simultaneously compressing successive tooth-forming areas of said rim in lines parallel to the axis of said blank to form successive relieved teeth upon one or both faces of said blank, the outer ends of which teeth are defined by the peripheral line of said blank, and the inner ends of which teeth are defined by the outer wall of the flowage-groove in said blank; second, axially boring said tooth-blank; third, grinding or cutting away successive peripheral portions of said tooth-blank at points in parallelism but at right angles to the faces between the cutting-edges of the teeth upon the face of said blank to provide circumferential relief or chip spaces, and, fourth, grinding the edges of the teeth to true the same and form the narrow slightly-relieved "land" 14 adjacent thereto. These operations produce a finished cutter, as shown in Figs. 9, 10, and 11, and designated by C.

In the operation of forming a tooth-milling-cutter blank, as illustrated in Figs. 7 and 8, and designated in a general way by B', from an annularly-recessed plane-faced blank B, as shown in Figs. 5 and 6, with apparatus as shown in Figs. 1 and 2 of the drawings said blank is placed in its natural unheated condition in the casing-die D and between the working ends of the two compressor-dies D' and D², as shown in Fig. 1 of the drawings, after which the plunger of the drop-press (not shown) is operated to force the two dies D' and D² toward each other and compress the blank B between them, to thereby form the teeth 10 in the opposite faces of said blank and to produce a toothed blank, as shown in said Figs. 7 and 8.

With the apparatus herein described as applied to the making of the particular cutter specified the blank B, undergoing compression by the dies D' and D², will at the first stage of the compression period be revolved slightly by the action of the dies D' and D², owing to the peculiar form of the teeth-forming grooves in said dies, so that the teeth upon the blank will be practically formed by the combined action of the compression and the lifting of the metal between the compressor-dies. Also, owing to the angle of the successive teeth with relation to each other, as shown most clearly in Fig. 7 of the drawings, the teeth of the compressor-dies tend to force the metal outward, so as to bring the blank to a perfect fit within the casing-die or outer die D, thus securing uniformity of diameter of successively-formed toothed cutter-blanks when produced by this apparatus. Moreover, during the compression of the teeth upon the opposite faces of the blank the convergent rear faces of the oppositely-disposed teeth formed in the blank by the compressor-dies tend to force the corresponding faces of the serrations or teeth of the dies down said rear faces of the teeth formed in the blank, and the action of the wedge formed by the displacement of the metal of the blank in the lines converging from the plane faces thereof will tend to cause a rotation of the compressor-dies relatively to said blank, the rotation of said dies being resisted by the connection between the same and the casing-die.

For resharpening the cutter C (shown in Figs. 9, 10, and 11) the lands 14 are reground, thereby leaving the faces 15 of the cutter-teeth untouched after the cutter-blank has been operated upon by the compressor-dies D' and D², and thus providing a continuous cutting-face having a surface of the highest degree of compression.

When the blanks are grooved to form flowage-spaces to receive the displaced metal $m$, the outer diameter of the groove will be substantially coincident with the inner diameter of the teeth portion of the compressor-die.

Having thus described my invention, I claim—

1. A milling-cutter consisting of a circular rim having a circuit of compressed and relieved teeth on the opposite side faces thereof; and having successive, inclined relief-notches in the periphery thereof contiguous to the successive teeth of the rim; a relatively-thin, continuous annular web contiguous to the inner face of said rim; and an axially-bored circular middle portion contiguous to said web, substantially as described, and for the purpose set forth.

2. A milling-cutter blank consisting of a plane-faced blank having a circular hub; a concentric rim having a circuit of compressed and relieved teeth in the opposite side faces of said rim; and a relatively-thin, continuous annular web between and connecting said rim and hub, to thereby form a continuous annular flowage-groove between said hub and rim, substantially as described, and for the purpose set forth.

3. A face-mill cutter-blank consisting of a plane-faced blank having a non-compressed circular, reinforced hub; a concentric, reinforced rim having a circuit of compressed and relieved teeth on opposite side faces thereof; and a relatively-thin annular web connecting the reinforced hub and the toothed rim at a point centrally between the side faces thereof, to thereby form corresponding annular flowage grooves at opposite sides of the faces of the blank between and separating the hub from the toothed rim, substantially as described, and for the purpose set forth.

4. A circular milling-cutter consisting of a relatively-thin, annular, non-compressed, and axially-bored middle portion; a relatively-thick, concentric rim having a circuit of successive relieved and radially-disposed compressed teeth in the opposite side faces of said rim, and extending from the relatively-thin middle portion, to the periphery of the cutter, and also having successive, inclined relief-notches in the periphery thereof, contiguous to the successive teeth of the rim, substantially as described, and for the purpose set forth.

5. In an apparatus for forming milling-cutter blanks of the class specified, the combination with the casing; of a pair of oppositely-disposed compressor-dies, each having a circuit of successive radial teeth in relief upon the working-face of said die, and each having a plane-faced countersunk portion intermediate of the circuit of said teeth, and one of which dies is supported for sliding movement toward and from the other; a locking device between the dies and casing, and adapted for holding said dies against rotary movement relatively to the casing; and means for closing said dies upon a blank supported between the working-faces thereof, to thereby simultaneously form in the opposite faces of said blank a circuit of successive, radially-compressed teeth with an uncompressed portion intermediate of said compressed portion or teeth, substantially as described, and for the purpose set forth.

6. In an apparatus for forming milling-cutter blanks of the class specified, the combination with a casing-die; of a pair of compressor-dies movable toward and from each other within said casing-die, and having, each a circuit of successive cutter-teeth adapted to form corresponding teeth in the opposite faces of a blank supported between the working-faces of said dies, and having the teeth of each circuit disposed oppositely to those of the other circuit and at an inclination to the plane of the working-face of its compressor-die, whereby when the blank is compressed between said dies the convergent rear faces of the oppositely-disposed teeth formed in the blank by said dies tend to force the corresponding faces of the die-teeth down said rear faces of the teeth formed in the blank, and to thereby rotate the compressor-dies relatively to the blank and the casing-die; means for actuating the compressor-dies; and a key-and-slot connection between said compressor-dies and the casing-die, for securing all of said dies against rotation relatively to one another, substantially as described.

7. A milling-cutter consisting of a relatively-thin, annular, and axially-bored middle portion; a relatively-thick concentric rim having a circuit of successively-relieved and compressed teeth in the opposite side faces of said rim, and extending from the relatively-thin middle portion to the periphery of the cutter; and also having inclined relief-notches in the periphery thereof contiguous to the successive teeth of the rim, substantially as described, and for the purpose set forth.

CHARLES C. TYLER.

Witnesses:
FRED. J. DOLE,
S. W. POTTS.